Sept. 15, 1959 — C. A. BILLMAN — 2,903,784
MILLING CUTTER
Filed Oct. 8, 1956

INVENTOR.
CARL A. BILLMAN
BY
ATTORNEY

United States Patent Office 2,903,784
Patented Sept. 15, 1959

2,903,784

MILLING CUTTER

Carl A. Billman, Rochester, N.Y.

Application October 8, 1956, Serial No. 614,597

2 Claims. (Cl. 29—105)

The present invention relates to metal cutting tools of the inserted blade type, and more particularly to face-mill cutters and boring tools of the inserted blade type.

Cutting blades of triangular cross-sectional shape are in use in face-mill cutters. Blades of this type receive a minimum amount of support from the rotary cutting head in proportion to their size, and in use exert a splitting force against the cutting head particularly as a result of cutting pressure. Furthermore, the closeness of spacing between adjacent cutting blades in the head as limited because of the triangular section of the blades and by the requirement for support of the blades by the rotary head.

A primary object of the present invention is to provide a face-mill cutter or boring tool having an improved blade design permitting closer spacing of adjacent blades.

Another object of the invention is to provide a rotary cutting tool in which a greater number of blades can be placed in a cutting head of given diameter, without impairing the strength of the cutter head.

A related object of the invention is to provide a face-mill cutter or boring head having inserted cutting blades and having means for endwise adjustment of the cutting blades in which the most efficient use is made of the rotary cutting head as a support for said adjusting means.

Another object of the invention is to provide a rotary cutting tool having inserted cutting blades and means for rapid, accurate and facile endwise adjustment of the blades in the cutting head.

Still another object of the invention is to provide a rotary cutting tool having inserted, endwise-adjustable cutting blades, in which adjusting screws threaded into the cutter head are provided for adjustment of the blades, and in which the adjusting screws have greater purchase in the cutter head.

Another object of the invention is to provide an inserted blade type rotary cutting tool in which both the blades and the cutter head are more economical to manufacture than in known types of rotary cutting tools.

A related object of the invention is to provide an inserted blade type rotary cutting tool having blades of increased strength but requiring less costly high-speed steel for their manufacture than known types of blades.

A still further related object of the invention is to provide an inserted blade type rotary cutting tool having a cutter head that is simple to manufacture and that can readily be broached for the blade-receiving sockets after the holes for the adjusting screws have been drilled and reamed.

Other objects of the invention will be apparent hereinafter from the specification and from the recital of the appended claims.

These and other objects of the invention are accomplished by providing, in one embodiment of the invention, a rotary cutting head having a plurality of angularly-spaced blade-receiving sockets arranged about its axis. Each socket is of trapezoidal shape in cross-section. Each socket is threaded along its length, with the minor diameter of the threaded portion being at least equal to the diameter of a circle inscribed in the trapezoidal socket section and tangent to the parallel sides thereof and to at least one of the non-parallel sides thereof.

There are thus provided plane seating surfaces, and concave threaded portions recessed from the plane seating surfaces, in the sides of the sockets.

A blade is mounted in each socket with its cutting edge projecting therefrom beyond one side face of the cutter head. Each blade is of trapezoidal cross-section and of a size to fit snugly in its socket. The plane sides of each cutting blade are adapted to seat flush against the plane side seating surfaces of its socket.

A screw threaded into each socket bears against an end of each cutting blade and effects endwise adjustment of the blade in its socket. In one embodiment of the invention, this back-up screw has a conical surface which abuts against a complementary surface of the blade and urges the blade into its seat in the socket.

Known clamping means may be provided for securing each blade in its socket against the plane seating surfaces thereof. Such means may comprise a clamping member having a wedge-shaped head which engages the largest planar surface of the blade and which is reciprocable transversely of the blade socket. Each clamping member has a threaded shank and a nut is threaded on the shank and cutter head, so that rotation of the nut may cause movement of the wedge member in one direction or the other to clamp or to release the blade.

These and other details of the invention may be thus understood by reference to the following description, taken together with the drawings, in which.

Figure 1:
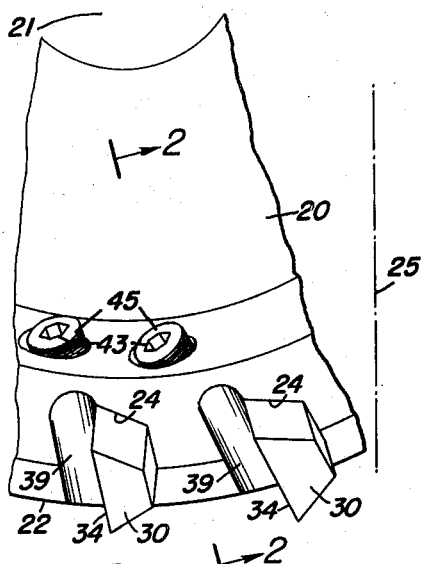
Fig. 1 is a fragmentary end view of a face-mill cutter made according to one embodiment of this invention.
Figure 2:
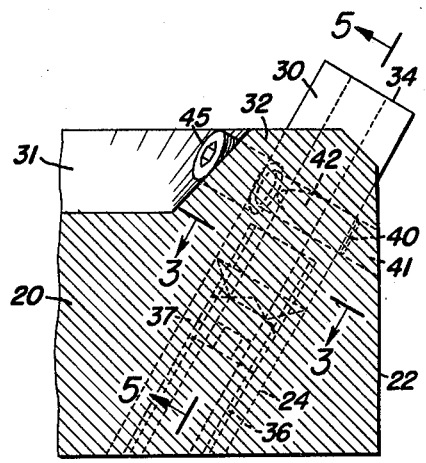
Fig. 2 is a section on the line 2—2 of Fig. 1, looking in the direction of the arrows.

Referring now to the drawing by numerals of reference, the cutting head 20 may be a single ring-like forging which has a central bore 21 on which it may be mounted on the tool spindle of a cutting machine. This head has a smooth peripheral surface 22 (Fig. 2). It is provided with a plurality of circularly-arranged recesses or sockets 24 which are inclined to the axis 25 (Fig. 2) of the cutter head and diverge from the axis.

Each socket 24 is broached or otherwise formed to a generally isosceles trapezoidal cross-section with the broadest face 26 of the trapezoid constituting the cutting face of the blade and facing in a generally radial direction but inclined outwardly of the cutter. Each socket is threaded, as denoted at 36, to receive an adjusting back-up screw 37. The thread size is such that the minor diameter 27 thereof is at least equal in size with the diameter of the circle inscribed in the trapezoidal socket section, and tangent to the parallel sides thereof and to at least one non-parallel side thereof.

Figure 3:
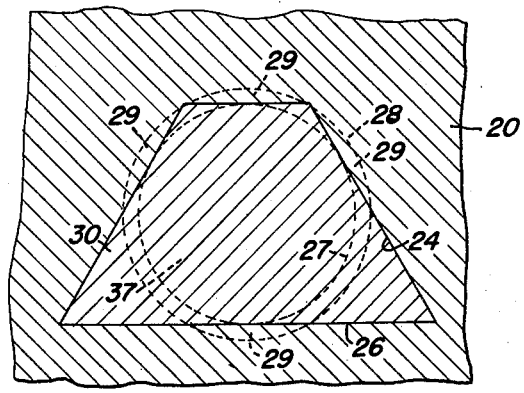
Fig. 3 is a section on a somewhat enlarged scale on the line 3—3 of Fig. 2, looking in the direction of the arrows.

With a blade of isosceles trapezoidal section, as shown in Fig. 3, the major diameter 28 of the thread then extends outwardly of the socket on each of the four sides thereof. There are thus provided supporting, threaded portions 29 in the socket for the back-up screw 37 on each of the four sides of the socket and the blade which is seated therein.

Figure 5:
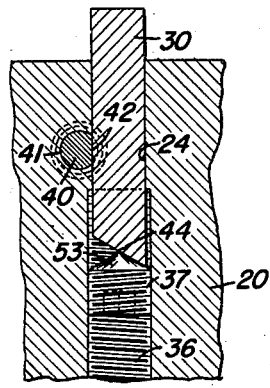
Fig. 5 is a section taken on line 5—5 of Fig. 2, looking in the direction of the arrows.

The four sidewalls of each socket are smooth adjacent the upper ends of the socket. At the opposite or lower end, the smooth socket walls are interrupted by the threaded portions 29, as indicated in Figs. 2, 3, and 5. Where the smooth walls of the socket are intersected by the thread, the threaded areas form concave portions 29 recessed in the sides of the socket, with the thread interrupted, as best shown in Fig. 3, by the plane surfaces of the socket.

The sockets 24 are adapted to receive the cutting blades 30 which are also of trapezoidal cross-section. The outside end face of the cutter head is dished as denoted at 31 to form a peripheral rim or flange 32. The blades 30 are mounted in the recesses or sockets 24 so that their cutting ends project beyond the peripheral flange 32 of the cutter head, and their projecting portions are sharpened in conventional fashion to form the usual cutting edge 34. Recesses 39 are provided in the head in front of the several blades for chip clearance.

Each adjusting back-up screw 37 abuts against the inner end of its blade. Each screw serves to adjust a blade longitudinally of its socket to control the amount that the blade projects beyond the face of the cutter head and to compensate for wear and the amount of stock removed from the blade during sharpening. When the minor diameter of the screw thread 27 is the inscribed circle described above, the major thread diameter 28 is sufficient to provide concave threaded portions 29 of a size to provide good support for the screw 37. At the same time, the overall socket size, including the threaded portions thereof, is at a minimum, thus making most efficient use of the cutter head for blade support, and permitting closer blade spacing.

Each blade is adapted to be held in the cutter by a wedge-shaped clamping member 40 which is mounted in a hole 41 in the cutter head alongside the blade socket, and inclined at right angles to the axis of the blade socket. Each wedge member 40 has a flattened portion 42 to engage the confronting side surface 26 of a blade 30 and each wedge member terminates at its other end in a threaded portion 48. The diameter of the threaded portion 48 is slightly less than the diameter of the adjacent clamping part of each wedge member 40, as clearly shown in Fig. 4, so that a shoulder 59 is formed between the threaded portion 48 and the adjacent part of each wedge member.

Each wedge member 40 is adapted to be moved to and from locking position by a nut 45 that engages the threaded portion 48 of the wedge member. In a preferred embodiment, each nut 45 has a right-hand thread 46 on its outside periphery, which is adapted to thread into a socket 49 formed in the cutter head 20, and has a left-hand thread 47 on the inside of its bore, which threads onto the left-hand thread portion 48 of the wedge pin 40.

Before assembly of wedge member 40 and its associated nut 45 into the cutter head 20, the nut is threaded onto the threaded portion 48 of the wedge member until it abuts against the shoulder 59 of the wedge member. When the wedge member is inserted into its hole 41 in the cutter head, the nut is rotated in the socket 49 until the flat surface 42 of the wedge member is in a plane which will be parallel to and abut flush against the confronting face 26 of a blade 30 when that blade is inserted in its blade socket 24. Then the blade is placed in its socket 24. The face 26 of the blade 30 abutting against the flat surface 42 of the wedge member now holds the wedge member against rotation with the nut 45. When the nut 45 is threaded further into socket 49, then, the wedge member 40 is moved bodily axially outwardly to clamp the blade 30 rigidly in the socket 24.

Removal of a blade from its socket is accomplished by unthreading the nut 45 sufficiently to move the wedge member axially inwardly sufficient to disengage the flat side 42 of the wedge member from the broad surface 26 of the blade. The blade may then be lifted out of its socket.

Hexagonal sockets 43 are provided in the nuts 45 to receive wrenches for turning the nuts.

Figure 4:
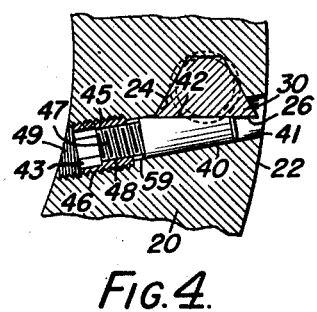
Fig. 4 is a sectional view on a reduced scale as compared to Fig. 3 and taken in a plane parallel to the plane of Fig. 3, showing a blade of the cutter, the wedge member for locking the blade in the cutter head, and the nut for moving the wedge member to and from locking position.

As shown in Figs. 4 and 5, the wedge 40 urges the cutting blade firmly against its seat on the two non-parallel sides of the trapezoidal sides of the socket. The supporting engagement between the walls of the cutting blade and the non-parallel supporting walls of the socket provides a firm and stable support particularly notable for the absence of any rocking during the cutting operation. The adjusting screw 37 has an upper conical surface 53 which engages a downwardly tapering bottom surface 44 of the cutting blade 30 and provides an additional force wedging the non-parallel walls of the blade against the supporting walls of the socket. The support provided by the socket for the non-parallel walls of the blade prevents transverse rocking of the blade during cutting. The spaced longitudinal support for the cutting blade in its socket provided by the wedge member 40 and the seating engagement of the conical surface 53 of the adjusting screw and the tapered bottom surface 44 of the blade restricts longitudinal rocking.

There has thus been provided a novel cutting blade and socket therefor having the many advantages sought. From a practical standpoint, it is very desirable that the minor diameter of the thread in the socket be at least equal in size with the diameter of a circle inscribed in the trapezoidal socket section tangent to the two parallel sides of the trapezoidal section and at least one of the non-parallel sides. The use of the smallest tap permissible for threading the socket in the cutting head allows the use of the smallest possible adjusting screw. This in turn permits close blade spacing. This is but one of the several advantages inherent in the present invention not found in prior cutting heads which make use of triangular blades. Furthermore, as is shown in Fig. 3, of the drawing, where the stated relationship exists between the sides of the trapezoidal socket section and the screw threads in the socket, the adjusting screw 37 will be supported by concave threaded portions on at least four sides of the socket. This compares with only three sides of the socket which have supporting threaded portions when a triangular blade is employed.

Normally, the sockets are formed in the cutting head by first drilling and reaming each hole. The drill size may be that of the inscribed circle, as previously described. The hole is then tapped up to the vicinity of the wedge clamping member. The hole is then broached along its entire length to the desired trapezoidal section. The blade is of a length equal to the blade hole, less the adjusting screw. Where it is desired to provide concave threaded portions larger than those provided by drilling to the inscribed circle then tapping, the hole is drilled, reamed, and then counterbored up to the vicinity of the clamping member, and the counterbore is then tapped.

When a conventional triangular socket and blade are used, the back-up and adjusting screw 37 may be supported around only approximately 50% of its periphery by threaded portions of the socket. However, when the trapezoidal cutting blade and socket of the present invention are employed, for a cutting edge of a comparable size, the back-up and adjusting nut 37 is supported by the concave threaded portions of the socket around 83% of its periphery.

The critical proportions of the trapezoidal section of the cutting blade may be best understood by reference to an isosceles trapezoid and an isosceles triangle having a common base. If a circle is inscribed in the triangle, the radius of that circle will indicate the approximate minimum thickness for the trapezoidal blade consistent with good strength characteristics. The diameter of this inscribed circle in the triangle is the approximate maximum altitude of the trapezoidal section of the cutting blade at which advantage may be taken of the characteristics of the trapezoidal shape for the cutting blade.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. A cutting tool comprising a rotary head having a plurality of blade-receiving sockets therein arranged about its axis, each socket being basically of trapezoidal shape in cross-section substantially throughout the whole of its length and having plane side blade seating surfaces, each socket being threaded along part of its length, the threaded portion being of a diameter to provide concave portions in the sides of the socket, the inner diameter of said threaded portion being at least equal in size with the diameter of a circle inscribed in a trapezoid defining the basic cross-sectional shape of the socket, and tangent to the parallel sides thereof and to at least one of the non-parallel sides thereof, the wider of the parallel sides of the socket forming the front wall of the socket considered in the direction of rotation of the tool and the other parallel side forming the rear wall of the socket, a blade mounted in each socket with its cutting portion projecting therefrom, each blade being of trapezoidal shape in cross-section and fitted into its socket with the parallel sides thereof disposed at the front and rear respectively of the blade considered in the direction of rotation of the cutting tool and with the wider of said parallel sides disposed at the front, each blade having plane sides and terminating at the end opposite its cutting portion in a plane terminal surface inclined from the front to the rear of the blade, means for securing each blade in its socket with its non-parallel sides seating against the respective plane seating surfaces of its socket, and a screw threaded into each socket to be adjustable axially thereof and having a conical surface in flush engagement with said plane terminal surface of the cutting blade to adjust the blade endwise in its socket and to wedge the blade into its socket against the non-parallel sides of the socket.

2. A cutting tool comprising a rotary head having a plurality of blade-receiving sockets therein arranged about its axis, each socket having a section basically in the shape of an isosceles trapezoid substantially throughout the whole of its length and having plane side blade seating surfaces, each socket being threaded along part of its length, the threaded portion being of a diameter to provide concave portions in the sides of the socket, the inner diameter of said threaded portion being substantially equal in size with the diameter of a circle inscribed in a trapezoid defining the basic cross-sectional shape of the socket, the wider of the parallel sides of the socket forming the front wall of the socket considered in the direction of rotation of the tool and the other parallel side forming the rear wall of the socket, a blade mounted in each socket with its cutting portion projecting therefrom, each blade having a cross-section in the shape of an isosceles trapezoid and having plane sides and fitted into its socket with the parallel sides thereof disposed at the front and rear, respectively, of the blade considered in the direction of rotation of the cutting tool and with the wider of said parallel sides disposed at the front, each blade also having a plane bottom face which is inclined downwardly from front to rear of the blade, means for securing each blade in its socket with its non-parallel sides seating against the respective plane seating surfaces of its socket, and a screw threaded into each socket to be adjustable axially thereof and having a conical surface in flush engagement with said plane bottom surface of the cutting blade to adjust the blade endwise in its socket and to wedge the blade into its socket against the non-parallel sides of the socket.

References Cited in the file of this patent

UNITED STATES PATENTS

| Number | Name | Date |
|---|---|---|
| 2,322,578 | Kutscha | June 22, 1943 |
| 2,322,579 | Kutscha | June 22, 1943 |
| 2,367,221 | Kraus | Jan. 16, 1945 |
| 2,385,750 | Weddell | Sept. 25, 1945 |
| 2,517,668 | Howald | Aug. 8, 1950 |
| 2,553,151 | Sharp | May 15, 1951 |
| 2,656,591 | Billman | Oct. 27, 1953 |
| 2,706,327 | Bodin | Apr. 19, 1955 |
| 2,787,823 | Kennicott | Apr. 9, 1957 |